Oct. 14, 1941.    R. L. DE LOACHE    2,259,298
REVERSING LINE STARTER
Filed April 24, 1940    2 Sheets-Sheet 1
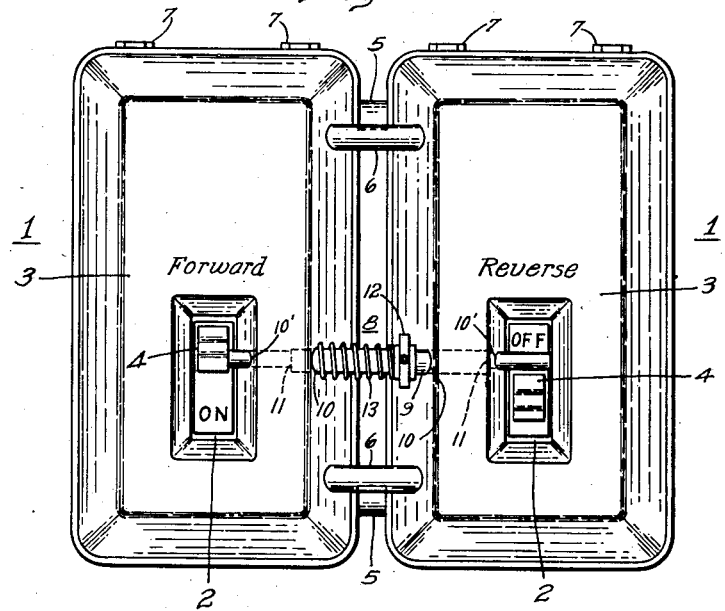
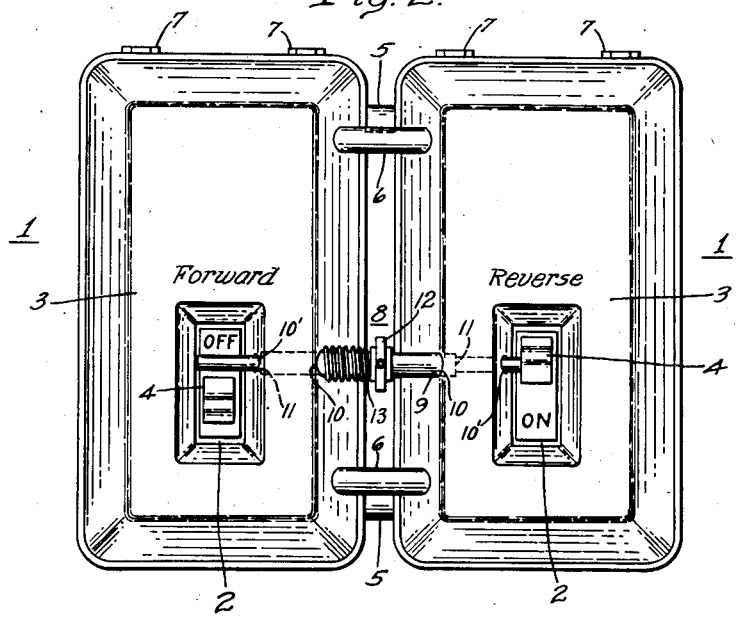
WITNESSES:
INVENTOR
Robert L. deLoache.
BY
Paul E. Friedemann
ATTORNEY Oct. 14, 1941.                R. L. DE LOACHE                2,259,298
                           REVERSING LINE STARTER
                            Filed April 24, 1940              2 Sheets-Sheet 2
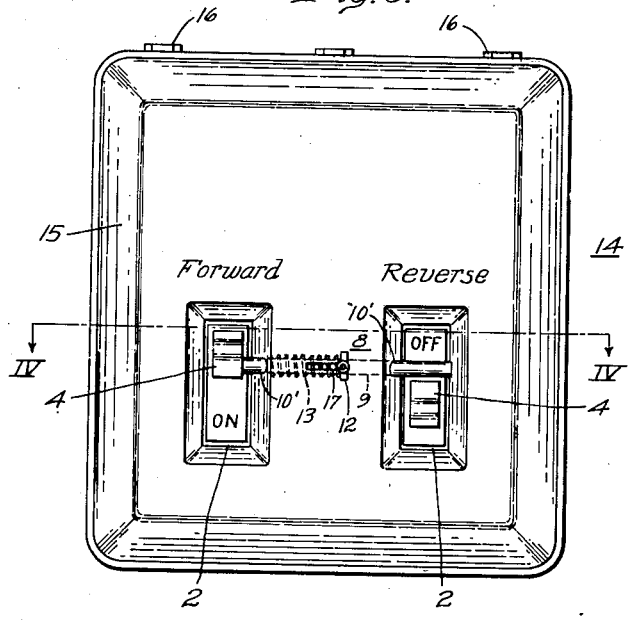
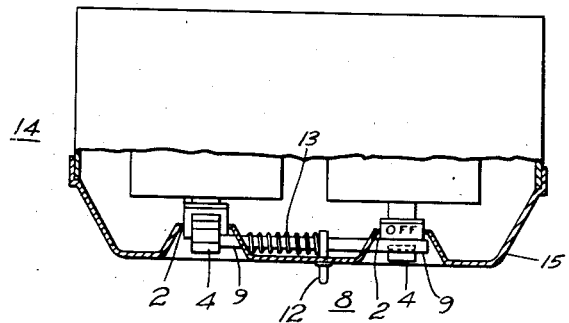
WITNESSES:
INVENTOR
Robert L. deLoache.
BY
Paul E. Friedemann
ATTORNEY Patented Oct. 14, 1941

2,259,298

UNITED STATES PATENT OFFICE 2,259,298

REVERSING LINE STARTER

Robert L. de Loache, Atlanta, Ga., assignor to Westinghouse Electric & Manufacturing Company, East Pittsburgh, Pa., a corporation of Pennsylvania Application April 24, 1940, Serial No. 331,348

2 Claims. (Cl. 200—50)

My invention relates generally to electric circuit interrupters and more particularly to interlocks for circuit interrupters.

In certain industrial applications, for example in the textile industry, the manual control of electric motors for forward and reverse direction of drive is quite necessary and desirable.

For example, in the winding of thread, wire, rope or other material on spools or rolls from a larger spool or roll, the material being wound on the spools or rolls often becomes tangled or is wound unevenly on the spool. This condition necessitates the unwinding or backing off of the material and unless the material is rewound on the main spool, it is often broken or damaged to such an extent as to cause considerable waste of material and loss of time.

While reversing motors and control switches, both manually and automatically operated, for such reversing motors, are well known in the electrical art, nevertheless there exists a field of application for an electric switching system for electric motors wherein the direction of rotation of the motor may be controlled manually and at as frequent or infrequent intervals as may be necessitated by operating conditions.

In such application, the direction of rotation of the motor is often controlled by two separate manually operated switches, one for the forward direction of rotation of the motor and the other for the reverse direction of rotation.

When the motor is operating, for example, in the forward direction and it becomes necessary to reverse the direction of rotation, the operator may neglect to open the circuit for the forward direction of rotation before he closes the circuit for the reverse direction of rotation, thereby causing possible damage to the motor, and the control apparatus as well as to the machine being driven by the motor.

I have found that if the forward and reversing switches are provided with an interlocking mechanism so as to prevent the closing of one of the switches until the other of the switches is opened, that considerable savings in material and time is effected and damage to the apparatus may be avoided.

It is therefore an object of my invention to provide an electrical switching control for electric motors that will overcome the aforementioned difficulties, and that may be simply and inexpensively manufactured and operated.

Another object of my invention is to provide an electrical switching control for electrical motors wherein the switches are provided with an interlocking mechanism to prevent the closing of one of the switches until after the other of the switches is opened.

These and other objects of my invention will become evident from the following detailed description, taken in conjunction with the accompanying drawings, in which:

Figure 1 is an elevational view of two switches mechanically connected into a unitary structure, showing the interlocking device according to my invention, in one operating position.

Fig. 2 is a view similar to Fig. 1 showing my interlocking device in an operating position opposite to that shown in Fig. 1.

Fig. 3 is an elevation view showing a single switch casing in which the two operating switches are located and also showing my interlocking device in operative position with respect to the switches and located substantially within the switch casing.

Fig. 4 is an end view of the switch structure shown in Fig. 3 with a part of the casing removed to more clearly show the interlocking device, the portion shown in section being taken along the line IV—IV of Fig. 3.

Referring to the drawings, in Figures 1 and 2, there are shown two switch boxes 1, having openings 2 located in the doors or covers 3 thereof to accommodate the handles or operating levers 4 of snap-acting switches (not shown) located within the boxes 1.

The two switch boxes 1 are secured into a unitary structure by members 5 welded or otherwise secured to the boxes 1. The members 5 are in the form of pipes or tubes and may also be used to accommodate wires running from one switch to the other for making the necessary electrical connections between the switches and a motor (not shown).

The doors or covers 3 of the boxes 1 are secured into a unitary structure by braces 6 welded or otherwise secured thereto.

The unitary door or cover structure 3 is hinged to the unitary box structure 1 by hinges 7, so that when it is necessary to open the switch box the two doors or covers 3 will open together.

The interlocking device 8, according to my invention, is slidably mounted in the door or cover structure 3. The interlocking device 8 comprises a shaft member 9 slidably mounted in openings 10 and 10' in the cover structure 3. The shaft member 9 is provided with shoulders 11 near the ends thereof to limit the length of travel of the shaft 9 between the limits of the openings 10'.

The shaft 9 is also provided with a handle or operating lever 12 rigidly secured thereto, for sliding or reciprocating the shaft from one position to the other position. A spring 13 is mounted around the shaft 9 and between the lever 12 and one of the covers 3 as shown, for biasing the shaft in one direction, i. e., to the right.

The ends of the shaft 9 project over or abut the operating levers 4 of the switches depending on the position of the interlock 8 as shown in Figs. 1 and 2.

The switch structure shown in Figs. 3 and 4 is a modification of the structure shown in Figs. 1 and 2.

In this structure the two switches are mounted in a single switch box 14, which is provided with a single door or cover 15, hinged to the box by hinges 16.

In this structure, the construction of the interlocking device 8 is substantially the same as that shown in Figs. 1 and 2, except that the shaft 9 is of uniform diameter and the interlocking device 8 is substantially concealed within the switch box under the cover 15 whereas as shown in Figs. 1 and 2, it is substantially external of the cover 3.

In the structure shown in Figs. 3 and 4, the operating handle or lever 12 extends through a slot 17 in the cover 15.

The operation of my novel interlocking circuit interrupter may be explained as follows:

In Figs. 1, 3 and 4, the "forward" switch is shown in the "on" position indicating that a motor (not shown) connected thereto would run in the forward direction of rotation, the "reverse" switch being shown in the "off" position.

In this position of the switches the end of the shaft 9 which extends through the opening 10' in the cover of the "forward" switch abuts the side of the operating lever 4 of the switch. The other end of the shaft 9 which projects through the opening 10' in the cover 3 of the "reverse" switch extends over the operating lever 4 of the switch. With the switches and interlocking device 8 in this position it is obvious that the reversing switch cannot be operated to the closed or "on" position, it being locked in open or "off" position by the interlock shaft 9.

Assuming that it becomes necessary to reverse the direction of the motor, (not shown) an operator moves the lever 4 of the "forward" switch to open or "off" position. The operator then moves the shaft 9 of the interlock 8 to the left so that the end of the shaft 9 is positioned over the lever 4 as shown in Fig. 2. In this operation the spring 13 is compressed between the handle 12 and the cover 3. With the interlock 8 in this position, the end of the shaft 9 in the "reverse" switch is withdrawn from over the lever 4 of the "reverse" switch and permits free movement of the lever 4 to the closed or "on" position, thus connecting the motor (not shown) to the circuit for reverse direction of operation.

When the lever 4 of the "reverse" switch is in the closed or "on" position, the end of the shaft 9 abuts the side of the lever 4 of the "reverse" switch, thereby holding the other end of the shaft 9 over the lever 4 of the "forward" switch, thus locking said switch in open or "off" position, as is illustrated in Fig. 2.

The motor (not shown) now connected in the reverse circuit position will operate in the reverse direction of rotation as long as the "reverse" switch is in the closed or "on" position.

In order to return the motor (not shown) to the forward direction of rotation, the operator operates the lever 4 of the "reverse" switch to the open or "off" position. The spring 13 being in a compressed position, as shown in Fig. 2, the shaft 9 of the interlock 8 is moved to the right by the bias action of the spring 13, so that the end of the shaft 9 in the "reverse" switch will be positioned over the lever 4 of the "reverse" switch, thereby locking it in the open or "off" position. The "reverse" switch cannot therefore be operated to closed or "on" position, due to the fact that the end of the shaft 9 of the interlock 8 in the "forward" switch abuts the operating lever 4 of the "forward" switch, and thereby positions the end of the shaft 9 in the "reverse' switch over the lever 4 of that switch, locking it in open or "off" position, as shown in Figs. 1, 3 and 4 of the drawings.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, an electric circuit interrupter comprising at least two separate, manually operable switches, operating handles for said switches and a mechanical interlock, manually operable in one direction and including resilient means for automatic operation in the opposite direction, disposed in cooperative relation with said handles, said interlock comprising a slidably mounted shaft having an operating handle and a spring to bias the shaft in one direction, said shaft, in one position, abutting against the side of one of the said handles, at one end thereof, thus allowing free movement of the handle to actuate the corresponding switch to either open or closed position, the other end of said shaft being disposed over the top of the other of said handles to prevent the movement of said handle to actuate the corresponding switch, thereby locking the other of said switches in one position.

2. In combination, an electric circuit interrupter comprising at least two separate, manually operable switches, operating handles for said switches and a mechanical interlock, manually operable in one direction and including resilient means for automatic operation in the opposite direction, disposed in cooperative relation with said handles, said interlock comprising a slidably mounted shaft having an operating handle and a spring to bias the shaft in one direction, said shaft, in one position, abutting against the side of one of the said handles, at one end thereof, thus allowing free movement of the handle to actuate the corresponding switch to open position, the other end of said shaft being disposed over the top of the other of said handles to prevent the movement of said handle to actuate the corresponding switch until after the first named handle is actuated to operate the corresponding switch to the open position.

ROBERT L. DE LOACHE.